(12) United States Patent
Bekki

(10) Patent No.: US 8,065,632 B2
(45) Date of Patent: Nov. 22, 2011

(54) INFORMATION SETTING DISPLAY APPARATUS AND INFORMATION SETTING DISPLAY METHOD

(75) Inventor: Toshihiko Bekki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 11/462,147

(22) Filed: Aug. 3, 2006

(65) Prior Publication Data
US 2007/0186185 A1  Aug. 9, 2007

(30) Foreign Application Priority Data
Aug. 8, 2005  (JP) .................. 2005-229182

(51) Int. Cl.
*G06F 3/048* (2006.01)
(52) U.S. Cl. ........................ 715/821; 715/810
(58) Field of Classification Search .................. 715/821
See application file for complete search history.

(56) References Cited

U.S. PATENT DOCUMENTS

| | | | |
|---|---|---|---|
| 2006/0020900 A1* | 1/2006 | Kumagai et al. | 715/767 |
| 2006/0121939 A1* | 6/2006 | Anwar et al. | 455/556.2 |
| 2008/0141123 A1* | 6/2008 | Kitada | 715/255 |
| 2011/0107209 A1* | 5/2011 | Ha et al. | 715/702 |

FOREIGN PATENT DOCUMENTS

| | | |
|---|---|---|
| JP | 10-198546 A | 7/1998 |
| JP | 2000-194469 A | 7/2000 |
| JP | 2000-284774 A | 10/2000 |
| JP | 2002-297278 | 10/2002 |
| JP | 2002297278 A * | 10/2002 |
| JP | 2004-207926 | 7/2004 |
| JP | 2004207926 A * | 7/2004 |

\* cited by examiner

*Primary Examiner* — Ashraf Zahr

(57) ABSTRACT

An information setting display apparatus and its control method are capable of displaying many setting items and setting contents on a small screen without degrading visual recognition and operation performance in a whole setting process and without sacrificing visual recognition of a setting item to be actually set. The apparatus displays setting items in one column and displays each of displayed setting items and corresponding setting contents in one row; in response to a selection of any one of the displayed setting items, displays the selected setting item by expanding the selected setting item, and displays the setting items not selected, by compressing the setting items not selected; and in response to a selection of any one of the setting contents corresponding to the selected setting item, displays the selected setting content by expanding it to a greater degree than the setting contents corresponding to the setting items not selected.

23 Claims, 5 Drawing Sheets

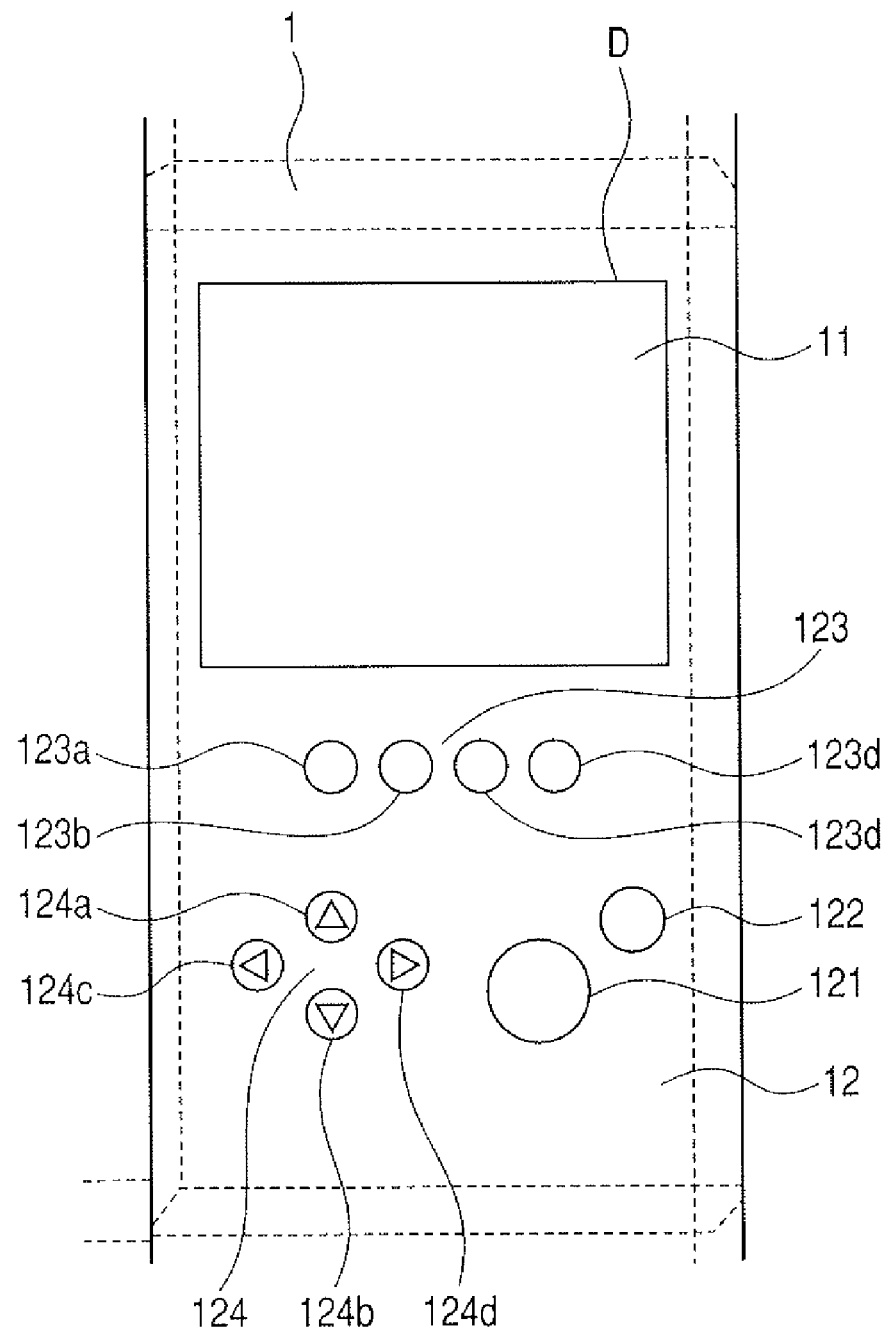

FIG. 3A

| SPECIFIED IMAGE(S) | 003 – 004 |
|---|---|
| TYPE OF SHEET | A  B  C  D  E  F  G  [H] |
| LAYOUT | 1   1   2   [4]   6   9 |
| NUMBER OF SETS OF PRINTS | 02 |
| AUTOMATIC CORRECTION | YES    [NO] |
| QUALITY LEVEL OF PRINTING | [FAST]   ORDINARY   FINE |
| PRINTING OF DATE | [YES]    NO |

FIG. 3B

| SPECIFIED IMAGE(S) | 003 – 004 |
|---|---|
| TYPE OF SHEET | A  B  C  D  E  F  G  [H] |
| LAYOUT | 1   1   2   [4]   6   9 |
| NUMBER OF SETS OF PRINTS | 02 |
| AUTOMATIC CORRECTION | YES    [NO] |
| QUALITY LEVEL OF PRINTING | [FAST]   ORDINARY   FINE |
| PRINTING OF DATE | [YES]    NO |

FIG. 4A

| | | | | | | | |
|---|---|---|---|---|---|---|---|
| SPECIFIED IMAGE(S) | 003 – 004 | | | | | | |
| TYPE OF SHEET | A | B | C | D | E | F | G | [H] |
| LAYOUT | 1 | 1 | 2 | [4] | 6 | 9 | | |
| NUMBER OF SETS OF PRINTS | 02 | | | | | | |
| AUTOMATIC CORRECTION | YES | | [NO] | | | | |
| QUALITY LEVEL OF PRINTING | [FAST] | ORDINARY | FINE | | | | |
| PRINTING OF DATE | [YES] | NO | | | | | |

FIG. 4B

| | | | | | | | |
|---|---|---|---|---|---|---|---|
| SPECIFIED IMAGE(S) | 003 – 004 | | | | | | |
| TYPE OF SHEET | A | B | C | D | E | F | G | [H] |
| LAYOUT | 1 | 1 | 2 | [4] | 6 | 9 | | |
| NUMBER OF SETS OF PRINTS | 02 | | | | | | |
| AUTOMATIC CORRECTION | YES | | NO | | | | |
| QUALITY LEVEL OF PRINTING | [FAST] | ORDINARY | FINE | | | | |
| PRINTING OF DATE | [YES] | NO | | | | | |

FIG. 5A

| SPECIFIED IMAGE(S) | 003 – 004 | | | | | | |
|---|---|---|---|---|---|---|---|
| TYPE OF SHEET | A | B | C | D | E | F | G | [H] |
| LAYOUT | 1 | 1 | 2 | [4] | 6 | 9 | | |
| NUMBER OF SETS OF PRINTS | 02 | | | | | | |
| AUTOMATIC CORRECTION | YES | | | [NO] | | | |
| QUALITY LEVEL OF PRINTING | [FAST] | ORDINARY | FINE | | | | |
| PRINTING OF DATE | [YES] | NO | | | | | |

FIG. 5B

| SPECIFIED IMAGE(S) | 003 – 004 | | | | | | |
|---|---|---|---|---|---|---|---|
| TYPE OF SHEET | A | B | C | D | E | F | G | [H] |
| LAYOUT | 1 | 1 | 2 | [4] | 6 | 9 | | |
| NUMBER OF SETS OF PRINTS | 02 | | | | | | |
| AUTOMATIC CORRECTION | YES | | | [NO] | | | |
| QUALITY LEVEL OF PRINTING | [FAST] | ORDINARY | FINE | | | | |
| PRINTING OF DATE | [YES] | NO | | | | | |

INFORMATION SETTING DISPLAY APPARATUS AND INFORMATION SETTING DISPLAY METHOD

BACKGROUND OF THE INVENTION

1. Field of the Invention

The present invention relates to a menu display setting apparatus having a small screen mounted on an ink jet recording apparatus for directly printing image data in a memory card, a composite printer with a scanner and a printer integrated together and the like.

2. Description of the Related Art

Generally, an ink jet recording apparatus receives print data sent from a computer connected thereto and properly prints the received print data on a recording sheet.

In order to print an image photographed with a digital camera or the like more easily, a function has been proposed which prints an image by directly connecting a digital camera to an ink jet recording apparatus. An ink jet recording apparatus called a photo-direct machine has also been proposed which prints image data in a memory card by directly mounting the memory card on the ink jet recording apparatus. A composite machine has recently been proposed which can be used also as a copy machine by integrating a scanner and an ink jet recording apparatus.

When image data is printed by a photo-direct machine or a composite machine of this type without commands from a computer, it is necessary to perform print settings and the like by using a display unit and operation keys mounted on the machine main body.

A display unit (small screen menu display setting unit) mounted on the main body of a photo-direct machine or a composite machine is considerably smaller than the computer screen. Therefore, in order to display a menu on the display unit mounted on the main body of the photo-direct machine or composite machine, some devices are therefore required which are different from the case in which a menu is displayed on the computer screen.

In a known small screen menu display setting unit, a plurality of setting items are displayed being arranged in one column (along a vertical direction), and setting contents corresponding to the plurality of setting items respectively are displayed being arranged in one row (for example, refer to Japanese Patent Laid-open Publication No. 2004-207926, p. 9, FIG. 4). According to this Publication, setting contents as selected can be identified as a setting value by displaying an outer frame or highlight indication. An apparatus is known by which only setting items to be set are displayed in characters, setting contents are also displayed, and setting items other than the setting item to be set are displayed by only icons to improve visual recognition on a small screen (for example, refer to Japanese Patent Laid-open Publication No. 2002-297278, p. 10, FIG. 4).

With the display method described in the former Publication, since setting items and setting contents are displayed in a list, visual recognition and operation performance of a whole setting process are excellent. However, as the number of setting items increases, each setting item and each setting content become small in size, posing a problem of sacrifice of visual recognition of each character and each icon.

With the display method described in the latter Publication, since only setting items to be set are displayed large and setting items other than the setting items to be set are displayed by icons, a large number of setting items can be displayed even on a small screen. However, the contents of the setting items displayed as the icons cannot be displayed as a list, posing a problem of degraded visual recognition and degraded operation performance in the whole setting process.

SUMMARY OF THE INVENTION

The present invention can provide an information setting display apparatus and its control apparatus capable of displaying a large number of setting items and setting contents on a small screen without degrading visual recognition and operation performance in a whole setting process and without sacrificing visual recognition of a setting item to be set.

Further features of the present invention will become apparent from the following description of exemplary embodiments with reference to the attached drawings.

BRIEF DESCRIPTION OF THE DRAWINGS

FIG. 2 is an enlarged view showing an example of a display unit D with an operation key unit 12 mounted on the ink jet recording apparatus 1.

FIGS. 3A and 3B are schematic diagrams of display screens displayed on a display part 11 provided in the display unit D of the first embodiment, FIG. 3A is a diagram showing a display screen during a non-setting operation, and FIG. 3B is a diagram showing a display screen during a setting operation.

FIGS. 4A and 4B are schematic diagrams showing examples of display screens of an ink jet recording apparatus according to a second embodiment of the present invention.

FIGS. 5A and 5B are schematic diagrams showing examples of display screens of an ink jet recording apparatus according to a third embodiment of the present invention.

DESCRIPTION OF THE EMBODIMENTS

Figure 1:
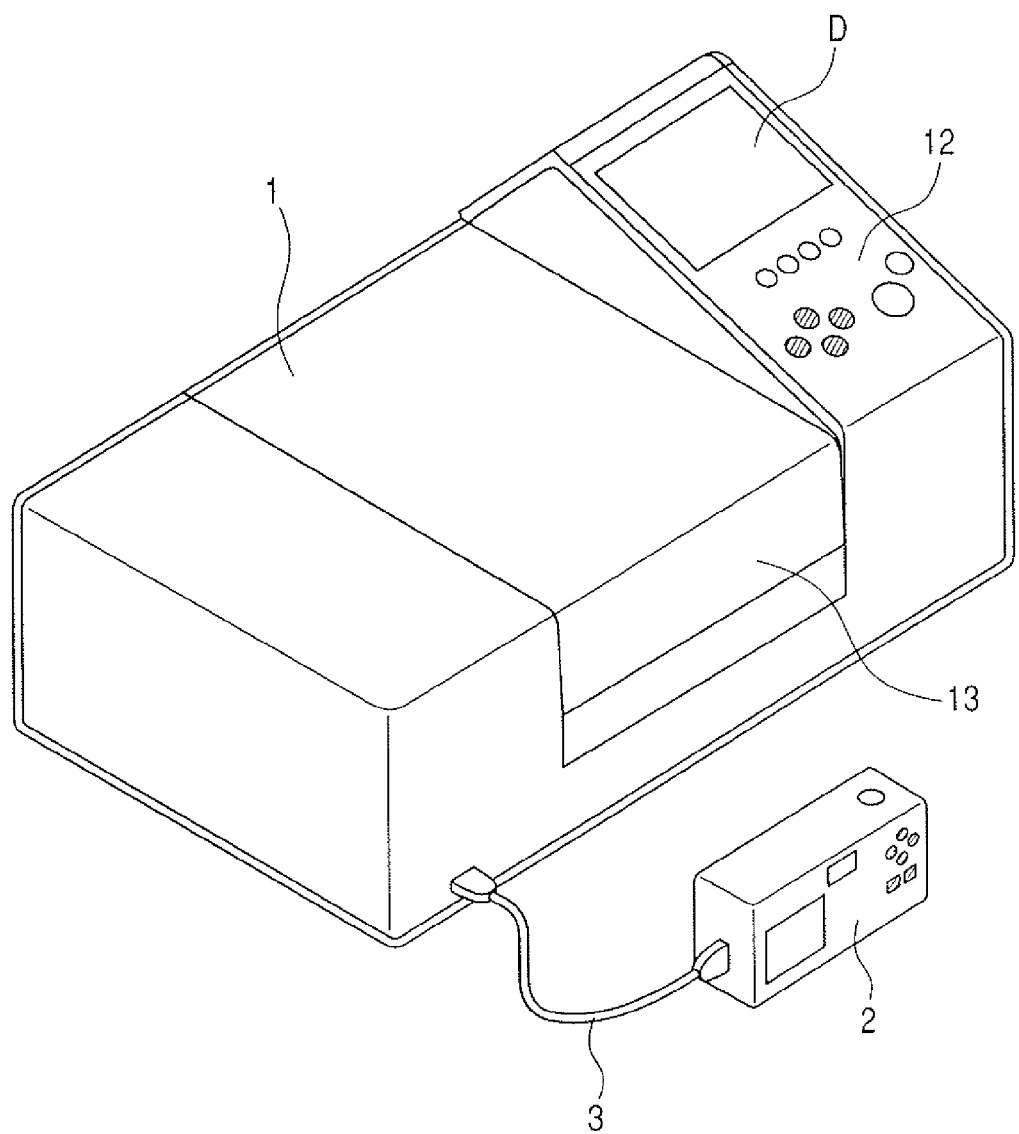
FIG. 1 is a perspective view of an ink jet recording apparatus 1 according to a first embodiment of the present invention.

Embodiments of the present invention will be described.

First Embodiment

FIG. 1 is a perspective view of an ink jet recording apparatus 1 according to the first embodiment of the present invention.

The ink jet recording apparatus 1 has a display unit D, an operation key unit 12 and a recording unit 13.

The display unit D is a display unit such as LCD mounted on the ink jet recording apparatus 1 and has a display part 11.

A digital camera 2 is connected to the ink jet recording apparatus 1 via a connection cable 3.

FIG. 2 is an enlarged view of an example of the display unit D with an operation key unit 12 mounted on the ink jet recording apparatus 1.

The operation key unit 12 has a print start key 121, a print stop key 122, a mode select key 123, a print setting mode key 123a, a layout mode key 123b, an image display mode key 123c, a maintenance mode key 123d, a cross key 124, an up key 124a, a down key 124b, a left key 124c and a right key 124d.

FIGS. 3A and 3B are schematic diagrams of display screens displayed on the display part 11 provided in the display unit D of the first embodiment, FIG. 3A is a diagram showing a display screen during a non-setting operation, and FIG. 3B is a diagram showing a display screen during a setting operation.

In FIG. 3A, setting items are displayed in one column (along a vertical direction). In the first embodiment, the setting items include seven items: "specified image(s)"; "type of sheet"; "layout"; "number of sets of prints"; "automatic correction"; "quality level of printing"; and "printing of date". Each of these items can be set. Setting contents corresponding to a predetermined setting item are displayed in the same row as that in which the predetermined setting item is displayed. For example, the setting contents of the setting item "quality level of printing" have three types "fast", "ordinary (or general)" and "fine" and are displayed in the same row as that in which the setting item "quality level of printing" is displayed. Since an outer frame is displayed for the setting content "fast", it means that the setting content "fast" is selected for the setting item "quality level of printing".

The row displaying the setting item "layout" displays the setting contents as to how selected images are disposed on a single sheet. Namely, displayed on the right side of the setting item "layout", are images showing the layouts of selected images (arrangement examples of selected images) and the numbers of images to be displayed on a single sheet. An outer frame is displayed for the numerical value indicating the number of images. This numerical value indicates the number of images.

In the first embodiment, although an outer frame is displayed for the selected setting contents, the selected setting contents may be displayed by highlight indication of reversing black and white.

In the first embodiment, the setting contents for the setting item "layout" include the following six contents. From the left end, "layout of printing one image without a margin on a single sheet", "layout of printing one image with margin on a single sheet", and "layouts of printing two, four, six and nine images with margin on a single sheet, respectively".

The up key 124a and down key 124b are item input means. By depressing the up key 124a and down key 124b, the setting items such as "specified image(s)", "type of sheet", and "layout" are selected. The left key 124c and right key 124d are setting content input means. By depressing the left key 124c and right key 124d, the setting value for each setting item is selected. For example, for the setting item "quality level of printing", the setting contents "fast", "ordinary" and "fine" are selected. A cursor position is indicated by a bold outer frame. Namely, setting values (selected setting contents) selected in the setting items are surrounded by the bold outer frame.

In the first embodiment, a plurality of setting items are displayed in one column and the setting contents belonging to one setting item are displayed in the same row as that in which the setting item is displayed. The relation between the row and column may be reversed. Namely, a plurality of setting items may be displayed in one row, and setting contents belonging to one setting item may be displayed in the same column as that of the setting item.

FIG. 3B is a diagram showing the display screen during the setting operation. Specifically, FIG. 3B shows the state when the setting item "quality level of printing" is set.

The row of the selected "quality level of printing" is displayed being expanded up and down, whereas the rows of the setting items not selected are displayed being compressed up and down. Since the setting content "fast" is selected, an outer frame is displayed for the setting content "fast". Only the setting content "fast" is expanded laterally.

The setting contents displayed in the row in which the setting item "layout" is displayed are also compressed up and down. If the setting contents are displayed being simply compressed up and down, a space between the displayed setting contents is corrupted and the displayed setting contents become unclear. Therefore, sizes and aspect ratios of images of the displayed setting contents are changed so as to maintain the displayed contents clear and leave spaces. Since the outer frame displayed for the setting content "fast" is bolder than the outer frames in other rows, it can easily confirm that the row displaying the bold outer frame is the row presently set.

As described above, since the row displaying the selected setting content is displayed being expanded, visual recognition and operation performance of the setting process can be improved. Since the display contents in other rows are not changed although the display size is compressed, it is possible to confirm the setting contents from the outer frames.

As described above, since compression and expansion are performed without changing the whole arrangement and the layout of each image and character, as a user becomes accustomed to use, the user can grasp whether the setting state is the same as usual by glancing at the positions of outer frames, and operation performance of the setting work can be improved.

Second Embodiment

FIGS. 4A and 4B are schematic diagrams showing examples of display screens of an ink jet recording apparatus according to the second embodiment of the present invention.

The structure of an ink jet recording apparatus of the second embodiment is similar to that of the ink jet recording apparatus 1 of the first embodiment.

FIG. 4A shows a display screen during the non-setting operation in the second embodiment, and FIG. 4B shows a display screen during the setting operation in the second embodiment.

In the second embodiment, the lateral width of the display part (display screen) 11 is narrow.

In the second embodiment, since a bold outer frame is displayed for the setting content "fast" of the setting item "quality level of printing", it can be confirmed that the present state is to set the setting item "quality level of printing" and the setting content "fast" is selected. In this state, although the row of the setting item "quality level of printing" is displayed being expanded up and down, the lateral width of the display part 11 is narrow. If the selected setting content "fast" with the bold outer frame is expanded laterally, the setting contents "general" and "fine" become too small. This is a reason why only the row is expanded up and down.

Third Embodiment

FIGS. 5A and 5B are schematic diagrams showing examples of display screens of an ink jet recording apparatus according to the third embodiment of the present invention.

The structure of an ink jet recording apparatus of the third embodiment is similar to that of the ink jet recording apparatus 1 of the first embodiment.

FIG. 5A shows a display screen during the non-setting operation in the third embodiment, and FIG. 5B shows a display screen during the setting operation in the third embodiment.

Also in the third embodiment, the lateral width of the display part (display screen) 11 is narrow. This display part is used when sufficient visual recognition cannot be retained if the whole selected row is expanded in the lateral direction.

In this example, since a bold outer frame is present at "4" displayed in the setting item "layout", it can be confirmed that the present state is to set the setting item "layout" and the setting content indicates printing four images on a single sheet in a matrix shape.

In this case, although the row displaying the setting item "layout" is displayed being expanded up and down, the lateral width of the display screen is narrow. Therefore, it is not possible to expand the whole row displaying the setting item "layout" in the lateral direction, and a user cannot understand correctly the layout state, if the row is expanded only up and down.

In order to solve this problem, only the image of the selected setting content, i.e., only the image having a bold outer frame being displayed for the numerical number indicating the number of images, is expanded as much as possible, and other images are displayed being compressed more than in the non-setting display state.

The image representative of the layout can be displayed larger by compressing the setting contents not selected, similar to compressing the rows not selected. The image of the layout displayed being expanded can express, as correctly as possible, an aspect ratio of a sheet, an aspect ratio of photographs to be printed, a margin and the like. It is therefore possible to provide a user with easy-to-understand operation performance.

Correctness of the aspect ratio and margin is sacrificed for a compressed layout. However, since the compressed layout is displayed schematically in order to facilitate distinguishment, it is possible to confirm the selected layout and other setting values.

Even if a display screen is small and characters are corrupted if compression is effected, the whole setting items can be viewed properly as a list by adopting a method of maintaining visual recognition of the whole screen and displaying outer frames and the like.

According to the embodiment, visual recognition of the selection operation can be improved and the whole setting state can be viewed properly as a list. It is therefore possible to realize good setting operation performance.

According to the embodiment, when rows or columns not selected are compressed, spaces between images are maintained so as to allow distinguishing of the contents of even a compressed image. It is therefore possible to improve recognition of the setting state as a list.

According to the embodiment, when a selected row is expanded and if each setting value is displayed as an image, only the image of the selected setting content is expanded and the images of other setting contents are compressed. It is therefore possible to improve visual recognition of the selection operation.

According to the present invention, there are provided advantages that when a number of setting items are displayed on a small screen, visual recognition and operation performance of the whole setting operation are not degraded and visual recognition of an individual item to be set is not sacrificed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-229182, filed on Aug. 8, 2005 which is hereby incorporated by reference herein in its entirety.

What is claimed is:

1. A display control apparatus comprising:
   a display apparatus; and
   a selecting unit configured to select a setting item from a plurality of setting items according to an instruction by a user,
   wherein said display apparatus displays the plurality of setting items and a plurality of setting contents corresponding to each of the plurality of setting items at an intermediate size between a large size and a small size as a default display screen, so that all of the plurality of setting items, which can be selected by said selecting unit and changed in size in the default display screen, are displayed with the intermediate size before any of the plurality of setting items are selected by said selecting unit; and
   wherein, when any one of the plurality of setting items displayed in the default display screen is selected by said selecting unit,
   said display apparatus displays (i) the selected setting item, and (ii) the plurality of setting contents corresponding to the selected setting item, so that the selected setting item is displayed at a size which is changed from the intermediate size, used in the default display screen, to the large size, and an area in the display screen of said display apparatus, which is allotted to display the selected setting item and the plurality of setting contents corresponding to the selected setting item is larger than that in the default display screen, and
   said display apparatus displays (i) another setting item of the plurality of setting items as not selected, and (ii) the setting contents corresponding to the another setting item, so that the another setting item is displayed at a size which is changed from the intermediate size, used in the default display screen, to the small size, and an area in the display screen of said display apparatus, which is allotted to display the another setting item and the setting contents corresponding to the another setting item, is smaller than in the default display screen.

2. The display control apparatus according to claim 1, wherein said display apparatus displays at least one of the plurality of setting contents corresponding to the selected setting item, at a size which is changed from the intermediate size, used in the default display screen, to the large size.

3. The display control apparatus according to claim 2, further comprising:
   a second selecting unit configured to select a setting content of the plurality of setting contents corresponding to the selected setting item, according to an instruction by the user,
   wherein said display apparatus displays the setting content selected by the second selecting unit at a size which is changed from the intermediate size, used in the default display screen, to the large size.

4. The display control apparatus of claim 2, wherein said display apparatus displays at least one of the plurality of setting contents corresponding to the selected setting item, at a size which is changed from the intermediate size, used in the default display screen, to a size which is larger only in a horizontal or vertical direction.

5. The display control apparatus according to claim 3, wherein said display apparatus displays at least one of the plurality of setting contents corresponding to the selected setting item and not selected by said second selecting unit, at a size which is changed from the intermediate size, used in the default display screen, to the small size.

6. The display control apparatus according to claim 1, wherein said display apparatus displays the another setting item of the plurality of setting items, so that a space between adjacent setting items displayed by said display apparatus is maintained.

7. The display control apparatus according to claim 1, wherein said display apparatus displays the setting contents corresponding to each of the plurality of setting items in rows or columns.

8. The display control apparatus according to claim 7, wherein said display apparatus displays the selected setting item and the plurality of setting contents corresponding to the selected setting item so that a width of area for displaying a row or a column including the setting contents corresponding to the selected setting item is larger than that in the default display screen.

9. The display control apparatus according to claim 7, wherein said display apparatus displays the plurality of setting items and the plurality of setting contents on the display apparatus so that a setting content already selected from the plurality of setting contents corresponding to each of the plurality of setting items is indicated in the default display screen.

10. The display control apparatus according to claim 1, wherein said display apparatus displays the plurality of setting items including a name or title of each setting item.

11. The display control apparatus according to claim 1, wherein said display apparatus displays a plurality of setting contents, corresponding to another setting item of the plurality of setting items, as not selected and at a size which is changed from the intermediate size, used in the default display screen, to the small size.

12. A display control method comprising the steps of:
   selecting a setting item from a plurality of setting items according to an instruction by a user;
   causing a display apparatus to display the plurality of setting items and a plurality of setting contents corresponding to each of the plurality of setting items at an intermediate size between a large size and a small size as a default display screen, so that all of the plurality of setting items, which can be selected by the user and changed in size in the default display screen, are displayed with the intermediate size, before any of the plurality of setting items are selected by the user; and
   causing the display apparatus to, when any one of the plurality of setting items displayed in the default display screen is selected by a user,
   (1) display (i) the selected setting item and (ii) the plurality of setting contents corresponding to the selected setting item, so that the selected setting item is displayed at a size which is changed from the intermediate size, used in the default display screen, to the large size, and an area in a display screen of the display apparatus, which is allotted to display the selected setting item and the plurality of setting contents corresponding to the selected setting item, is larger than that in the default display screen, and
   (2) display (i) another setting item of the plurality of setting items as not selected and (ii) the setting contents corresponding to the another setting item, so that the another setting item is displayed, at a size which is changed from the intermediate size, used in the default display screen, to the small size, and an area in the display screen of the display apparatus, which is allotted to display the another setting item and the setting contents corresponding to the another setting item, is smaller than in the default display screen.

13. The display control method according to claim 12, wherein the display apparatus displays at least one of the plurality of setting contents corresponding to the selected setting item, at a size which is changed from the intermediate size, used in the default display screen, to the large size.

14. The display control method according to claim 13, further comprising the step of:
   selecting a setting content of the plurality of setting contents corresponding to the selected setting item, according to an instruction by the user,
   wherein the display apparatus displays the setting content selected by the user at a size which is changed from the intermediate size, used in the default display screen, to the large size.

15. The display control method according to claim 14, wherein the display apparatus displays at least one of the setting contents corresponding to the selected setting item and not selected by the user, at a size which is changed from the intermediate size, used in the default display screen, to the small size.

16. The display control method according to claim 13, wherein the display apparatus displays at least one of the plurality of setting contents corresponding to the selected setting item at a size which is changed from the intermediate size, used in the default display screen, to a size which is larger only in a horizontal or vertical direction.

17. The display control method according to claim 12, wherein the display apparatus displays the another setting item of the plurality of setting items, so that a space between adjacent setting items which are displayed is maintained.

18. The display control method according to claim 12, wherein the display apparatus displays the setting contents corresponding to each of the plurality of setting items in rows or columns.

19. The display control method according to claim 18, wherein the display apparatus displays the selected setting item and the plurality of setting contents corresponding to the selected setting item on the display apparatus so that a width of area for displaying a row or a column including the setting contents corresponding to the selected setting item is larger than that in the default display screen.

20. The display control method according to claim 18, wherein the display apparatus displays the plurality of setting items and the plurality of setting contents on the display apparatus so that a setting content already selected from the plurality of setting contents corresponding to each of the plurality of setting items is indicated in the default display screen.

21. The display control method according to claim 12, wherein the display apparatus displays the plurality of setting items including a name or title of each setting item.

22. The display control apparatus method according to claim 12, wherein the display apparatus displays a plurality of setting contents, corresponding to another setting item of the plurality of setting items, as not selected and at a size which is changed from the intermediate size, used in the default display screen, to the small size.

23. A computer-readable recording medium which stores a computer-executable program configured to execute a display control method, the display control method comprising:
   selecting a setting item from a plurality of setting items according to an instruction by a user;
   causing a display apparatus to display the plurality of setting items and a plurality of setting contents corresponding to each of the plurality of setting items at an intermediate size between a large size and a small size as a default display screen so that all of the plurality of setting items, which can be selected by the user and changed in size in the default display screen, are displayed with the intermediate size, before any of the plurality of setting items selected by the user; and causing the display apparatus to, when any one of the plurality of setting items displayed in the default display screen is selected by the user, (1) display (i) the selected setting item and (ii) the plurality of setting contents corresponding to the selected setting item, so that the selected setting item is displayed at a size which is changed from the intermediate size, used in the default display screen, to the large size, and an area in a display screen of the display apparatus, which is allotted to display the selected setting item and the plurality of setting contents corresponding to the selected setting item, is larger than that in the default display screen, and (2) display (i) another setting item of the plurality of setting items as not selected, and (ii) the setting contents corresponding to the another setting item, so that the another setting item is displayed, at a size which is changed from the intermediate size in the default display screen to the small size, and an area in the display screen of the display apparatus, which is allotted to display the another setting item and the setting contents corresponding to the another setting item, is smaller than in the default display screen.

\* \* \* \* \*